US006836558B2

(12) United States Patent
Doi et al.

(10) Patent No.: US 6,836,558 B2
(45) Date of Patent: Dec. 28, 2004

(54) METHOD, SYSTEM AND COMPUTER READABLE MEDIUM FOR IDENTIFYING CHEST RADIOGRAPHS USING IMAGE MAPPING AND TEMPLATE MATCHING TECHNIQUES

(75) Inventors: Kunio Doi, Willowbrook, IL (US); Hidetaka Arimura, Hiroshima (JP); Shigehiko Katsuragawa, Oita (JP); Junji Morishita, Kyoto (JP)

(73) Assignee: Arch Development Corporation, Chicago, IL (US)

( * ) Notice: Subject to any disclaimer, the term of this patent is extended or adjusted under 35 U.S.C. 154(b) by 662 days.

(21) Appl. No.: 09/816,217

(22) Filed: Mar. 26, 2001

(65) Prior Publication Data

US 2002/0021829 A1 Feb. 21, 2002

Related U.S. Application Data

(60) Provisional application No. 60/193,072, filed on Mar. 28, 2000.

(51) Int. Cl.$^7$ ................................................ G06K 9/00

(52) U.S. Cl. ....................... 382/131; 382/209; 382/213; 382/224; 382/278

(58) Field of Search .................................. 382/128, 130, 382/132, 209, 217–219, 224, 278

(56) References Cited

U.S. PATENT DOCUMENTS

| | | | |
|---|---|---|---|
| 4,459,359 A | 7/1984 | Neurath | |
| 4,687,734 A | 8/1987 | Chester | |
| 5,295,200 A | 3/1994 | Boyer | |
| 5,556,745 A | 9/1996 | Schupbach | |
| 5,982,915 A | * 11/1999 | Doi et al. | 382/130 |
| 5,982,945 A | * 11/1999 | Neff et al. | 382/271 |

FOREIGN PATENT DOCUMENTS

| | | |
|---|---|---|
| EP | 0 442 208 | 8/1991 |
| EP | 0 867 830 | 9/1998 |

OTHER PUBLICATIONS

"Computer Recognition of Chest Image Orientation" by Evanoff et al. Computer–Based Medical Systems, 1998. Proceedings. 11th IEEE Symposium on, Jun. 12–14, 1998. pp:1–5.*

C–H. Chou, et al., IEEE Transactions on Circuits and Systems, vol. 36, No. 10, pp. 1336–1342, "A VLSI Architecture for Real–Time and Flexible Image Template Matching", Oct. 1, 1989.

T. Ishida, et al., Journal of Digital Imaging, vol. 12, No. 2, pp. 77–86, "Application of Temporal Subtraction for Detection of Interval Changes on Chest Radiographs: Improvement of Subtraction Images Using Automated Initial Image Matching", May 1999.

M. Shimazu, et al., Computer–Aided Diagnosis in Medical Imaging, pp. 149–154, "Detection Algorithm of Interval Change Using 3D Thoracic Images", Sep. 20, 1998.

J. Morishita, et al., Medical Physics, vol. 28, No. 6, pp. 1093–1097, "An Automated Patient Recognition Method Based on an Image–Matching Technique Using Previous Chest Radiographs in the Picture Archiving and Communication System Environment", Jun. 2001.

* cited by examiner

Primary Examiner—Amelia M. Au
Assistant Examiner—Chong Kim
(74) Attorney, Agent, or Firm—Oblon, Spivak, McClelland, Maier & Neustadt, P.C.

(57) ABSTRACT

A method, system and computer readable medium for a computer-automated method for identifying given image data, including obtaining template image data corresponding to said given image data; calculating correlation values between the given image data and said template image data; and identifying said image data based on the correlation values calculated in the calculating step.

32 Claims, 14 Drawing Sheets

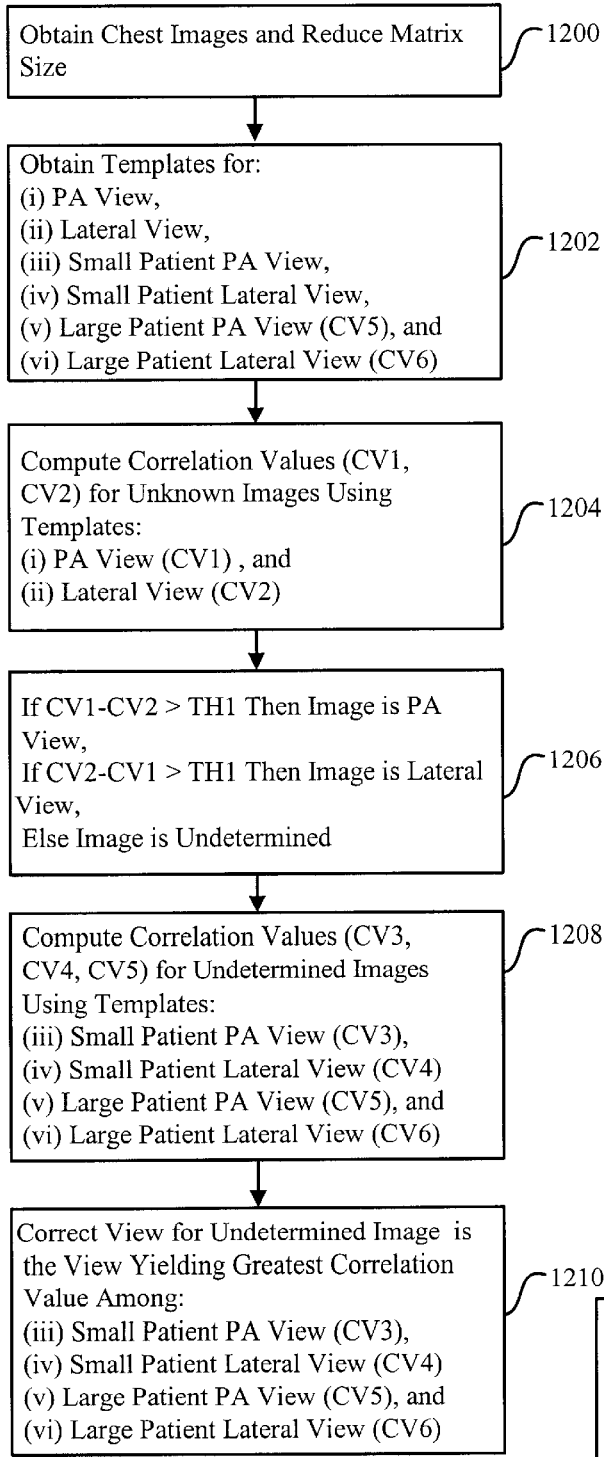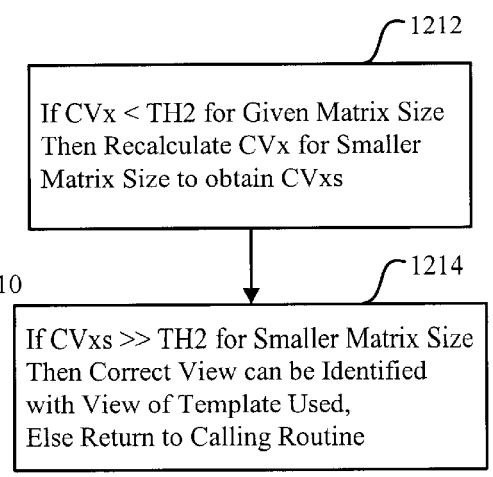
Figure 12a
Figure 12b

METHOD, SYSTEM AND COMPUTER READABLE MEDIUM FOR IDENTIFYING CHEST RADIOGRAPHS USING IMAGE MAPPING AND TEMPLATE MATCHING TECHNIQUES

CROSS-REFERENCE TO RELATED APPLICATIONS

This application claims priority under 35 U.S.C. § 119(e) to U.S. provisional patent application Ser. No. 60/193,072, filed on Mar. 28, 2000, the entire contents of which is incorporated by reference herein.

STATEMENT REGARDING FEDERALLY SPONSORED RESEARCH

The present invention was made in part with U.S. Government support under USPHS grant numbers CA 24806 and CA 62625 (National Institute of Health) and US Army grant number DAMD 71-96-1-6228. The U.S. Government has certain rights in the invention.

BACKGROUND OF THE INVENTION

1. Field of the Invention

The invention relates generally to the field of computer-aided diagnostic (CAD) schemes in chest radiography. The present invention also generally relates to computerized techniques for automated analysis of digital images, for example, as disclosed in one or more of U.S. Pat. Nos. 4,839,807; 4,841,555; 4,851,984; 4,875,165; 4,907,156; 4,918,534; 5,072,384; 5,133,020; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; 5,657,362; 5,666,434; 5,673,332; 5,668,888; 5,732,697; 5,740,268; 5,790,690; 5,832,103; 5,873,824; 5,881,124; 5,931,780; 5,974,165; 5,982,915; 5,984,870; 5,987,345; and 6,011,862; as well as U.S. patent application Ser. Nos. 08/173,935; 08/398,307 (PCT Publication WO 96/27846); Ser. Nos. 08/536,149; 08/562,087; 08/900,188; 08/900,189; 08/900,191; 08/900,361; 08/979,623; 08/979, 639; 08/982,282; 09/027,468; 09/027,685; 09/028,518; 09/053,798; 09/092,004; 09/121,719; 09/131,162; 09/141, 535; 09/156,413; 09/298,852; and 09/471,088; PCT patent applications PCT/US99/24007; PCT/US99/25998; and U.S. provisional patent applications No. 60/160,790 all of which are incorporated herein by reference.

The present invention includes use of various technologies referenced and described in the above-noted U.S. Patents and Applications, as well as described in the references identified in the appended LIST OF REFERENCES by the author(s) and year of publication and cross-referenced throughout the specification by numerals in brackets corresponding to the respective references, the entire contents of which, including the related patents and applications listed above and references listed in the LIST OF REFERENCES, are incorporated herein by reference.

2. Discussion of the Background

A recent trend toward increased practical use of picture archiving and communication systems (PACS) in many hospitals and medical centers is very likely to expedite clinical applications of computer-aided diagnostic (CAD) schemes in chest radiography. The PACS has been used as an image management system for improving the efficiency of radiology department, in some medical centers and hospitals. For maintaining reliability of the PACS, incorrect images and incorrect patient data should not be stored in the PACS. However, if the patient information associated with an image, such as the identification number or the patient name, has been entered incorrectly, the image will be stored in an incorrect patient folder, and it is difficult to find this error. During routine image interpretation, it is not uncommon that radiologists occasionally recognize a wrong patient's image which is displayed in a series of images for a given patient.

Accordingly, due shortcomings in the above-noted methods, it is desirable to develop a more reliable method for correct identification a patient's chest images.

In addition, for quantitative analysis of chest radiographs, such as computerized detection of lung nodules [1, 2] and interstitial infiltrates [3, 4] as well as temporal subtraction [5, 6] of a previous image from a current image, it is typically necessary to identify either posteroanterior (PA) or lateral views of chest images because the computerized scheme depends on the specific view used. [7, 8]

However, in PACS or digital archiving systems, the information on the PA and lateral views for chest radiographs is often not recorded. Although the digital imaging and communications in medicine (DICOM) standard can include such labeling and many other parameters, most of this useful information is commonly not entered, or incorrect data are stored occasionally.

Recently, artificial neural networks have been applied for the automatic labeling (i.e., PA or lateral) and orientation of chest images, and the reported accuracy is 98.7% for correcting labeling errors. [9]

However, due shortcomings in the above-noted methods, it is desirable to develop a more reliable method for identification of correct views of chest images.

SUMMARY OF THE INVENTION

Accordingly, an object of this invention is to provide a method, system and computer readable medium for a computer-automated method for correctly identifying an image as belonging to a given patient.

Another object of the invention is to provide a method, system and computer readable medium for a computer-automated method for correctly identifying an image as belonging to a given patient using a current and previous image of the patient.

Another object of the invention is to provide a method, system and computer readable medium for a computer-automated method for correctly identifying whether image data derived from a chest radiograph is representative of a PA view or a lateral view of a subject.

Another object of the invention is to provide a method, system and computer readable medium for a computer-automated method for examining whether image data of a given chest image is similar to data derived from image of PA or lateral views of a subject.

Another object of the invention is to provide a method, system and computer readable medium for a computer-automated method for measuring the similarity of two images by determining a cross-correlation coefficient (hereafter referred to as "correlation value") between image data of a template and image data of a given chest image.

These and other objects are achieved according to the invention by providing a new automated method, system and computer readable medium for identifying given image data, including obtaining template image data corresponding to the given image data; calculating correlation values between the given image data and the template image data;

and identifying the image data based on the correlation values calculated in the calculating step.

The present invention accordingly includes a computer readable medium storing program instructions by which the method of the invention can be performed when the stored program instructions are appropriately loaded into a computer, and a system for implementing the method of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein:

FIGS. 12a and 12b are flow charts illustrating (a) an overall scheme for correctly identifying either PA or lateral views of chest radiographs and (b) an optional artifact processing procedure, according to an embodiment of the present invention.

DESCRIPTION OF THE PREFERRED EMBODIMENTS

Figure 1:
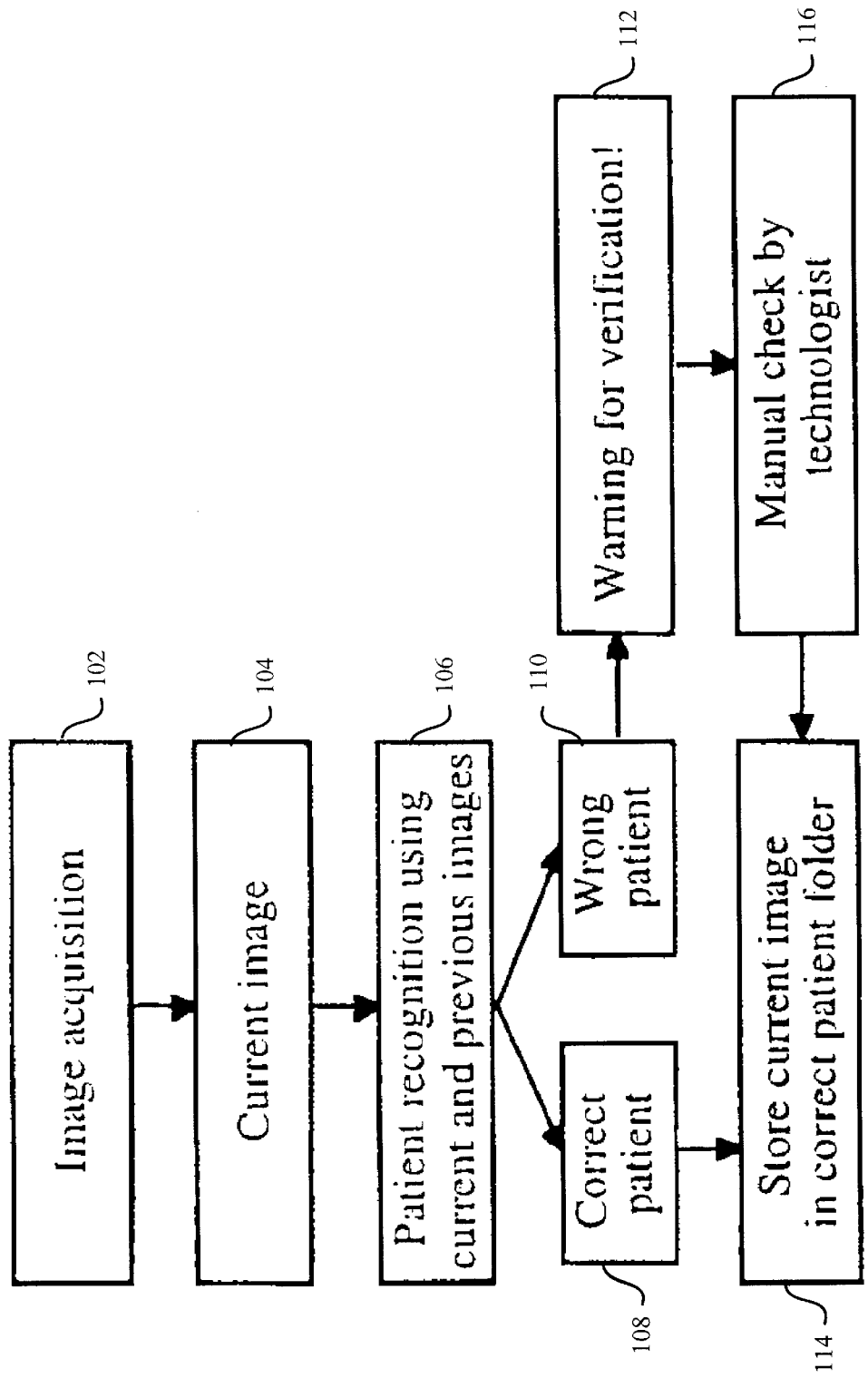
FIG. 1 is a flow chart illustrating an automated method for identifying current and previous chest radiograph images as belonging to a same patient by using an image-matching technique for comparison between the current and the previous chest radiographs.

Referring now to the drawings, wherein like reference numerals designate identical or corresponding parts throughout the several views, there are illustrated various embodiments of the present invention, as are further discussed.

The chest radiographs used for correctly identifying an image as belonging to a given patient according to the present invention consisted of 2000 posteroanterior chest radiographs that included 1000 current and 1000 previous images for 1000 different patients. All images were acquired with a Fuji Computed Radiographic system (Fuji photo film, Tokyo, Japan) with a matrix size of 1760×1760 (0.2 mm pixel size) and ten-bit gray scale. The computerized scheme for the image-matching method was developed by use of a Sun SPARCstation 5 (Sun Microsystems, CA, USA) and an EPSON PC SL2 (Epson, Tokyo, Japan).

To identify whether a current image A and a previous image B belong to a given patient, a cross-correlation value C between the current image A and the previous image B is determined. The matrix size for the current image A and the previous image B is I×J. The cross-correlation value C is given by the following equation:

$$C = \frac{1}{IJ} \sum_{j=1}^{J} \sum_{i=1}^{I} \frac{\{A(i,j) - \bar{a}\} \cdot \{B(i,j) - \bar{b}\}}{\sigma_A \cdot \sigma_B}$$

where:

$$\bar{a} = \frac{1}{IJ} \sum_{j=1}^{J} \sum_{i=1}^{I} A(i,j)$$

$$\bar{b} = \frac{1}{IJ} \sum_{j=1}^{J} \sum_{i=1}^{I} B(i,j)$$

$$\sigma_A = \sqrt{\frac{\sum_{j=1}^{J} \sum_{i=1}^{I} (A(i,j) - \bar{a})^2}{IJ}}$$

$$\sigma_B = \sqrt{\frac{\sum_{j=1}^{J} \sum_{i=1}^{I} (B(i,j) - \bar{b})^2}{IJ}}$$

If images A and B are identical, C is 1.0. A high correlation value indicates a strong resemblance between the current image and the previous image.

FIG. 1 is a flow chart illustrating an automated method for identifying current and previous chest radiograph images as belonging to a same patient by using an image-matching technique for comparison between the current and the previous chest radiographs. In FIG. 1, when a current image (step 104) associated with patient information is transferred to the patient's folder in an image acquisition system (step 102, e.g., a PACS server), the previous image is automatically retrieved from the patient's folder (not shown), and the correlation value is determined by use of the above equations (step 106). To reduce the computation time for determination of the correlation value (step 106), the matrix size of the images is reduced from 1760×1760 to 64×64, based on results of a preliminary study, using a bi-lateral interpolation technique (not shown).

For identification of the current image as belonging to a wrong patient (step 110), the correlation value is determined for a previous image of a patient and a new current image of the "presumed" corresponding patient (step 106). This correlation value is compared with a threshold value (step 106) that is determined based on histogram analysis (not shown). If the correlation value is larger than the threshold, the current image is considered as belonging to the same correct patient (step 108) and is stored in the correct patient's folder in the PACS server. On the other hand, if the correlation value is smaller than the threshold, the current image is considered to belong potentially to a wrong patient (step 110). A warning sign is then provided to alert radiology personnel to verify whether the current image really belongs to this patient, based on comparison with the available previous image (step 112). When a staff member recognizes the warning, he/she manually checks the current image and the patient information (step 116), and corrective action can be taken before the wrong image is stored in the wrong patient's folder. Thus, the image is stored in the correct patient's folder (step 114).

Variations in sequential chest radiographs typically can be due to lung expansion, lateral and/or A-P inclination, and rotation. These variations between current and previous images will result in a reduction of the correlation value. Therefore, three different methods for the determination of correlation values were investigated. First, the correlation value was calculated based on two sequential images as acquired. Second, the current image was shifted horizontally and vertically to determine the best match between the two images. Finally, the current image was rotated (e.g., from minus five degrees to plus five degrees) to yield the largest correlation value.

Figure 2:
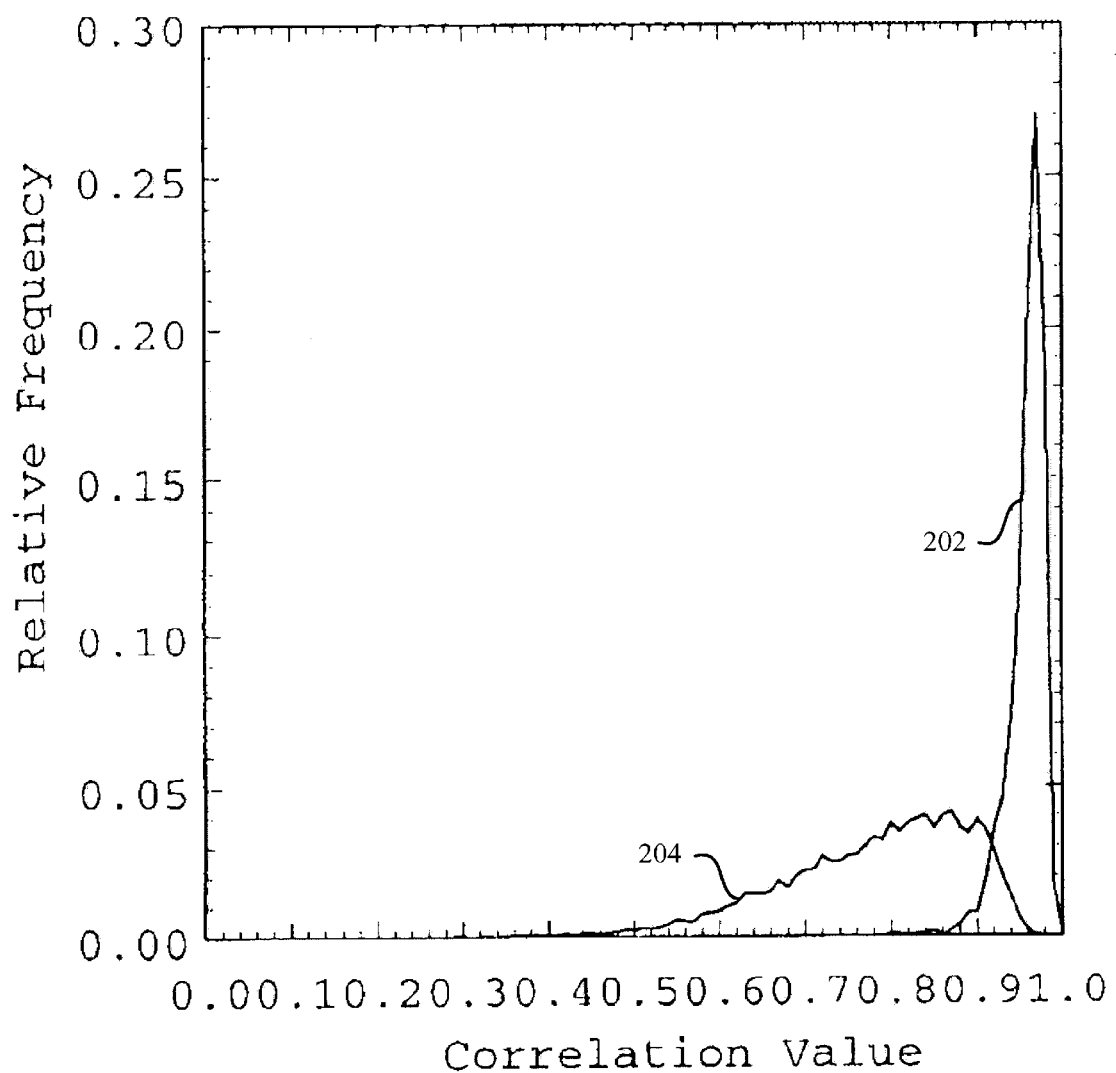
FIG. 2 is a graph illustrating histograms for correlation values obtained with the current and previous images for the same patients and different patients.

Correlation values were determined for the current and previous images for 1000 patients, and also correlation values for 1000 combinations of current and previous images obtained with two "wrong" patients. FIG. 2 is a graph illustrating histograms for correlation values obtained with the same, "correct" patients 202 and also with the different, "wrong" patients 204. It was found that the correlation values between the current and previous images for the same, "correct" patients 202 were generally greater than those for "wrong" patients 204. The correlation values for the correct patients 202 were distributed from 0.80 to 0.99. The correlation values for wrong patients 204 showed smaller correlation values than those for the correct patients, and were widely distributed from 0.29 to 0.97.

Although the two histograms overlap at correlation values greater than 0.80, most parts of the histograms are separated. These results are promising for identifying potentially "wrong" patients based on the present image-matching method. For example, if a threshold value of 0.80 is selected for determination of wrong patients, 47.8% of wrong patients in the database can be identified correctly as wrong patients, without any false warning for the correct patient. If a threshold value of 0.90 is employed, 85.7% of wrong patients in the database can be identified correctly as wrong patients with an error of 2% in yielding false warnings for correct patients.

Figure 3:
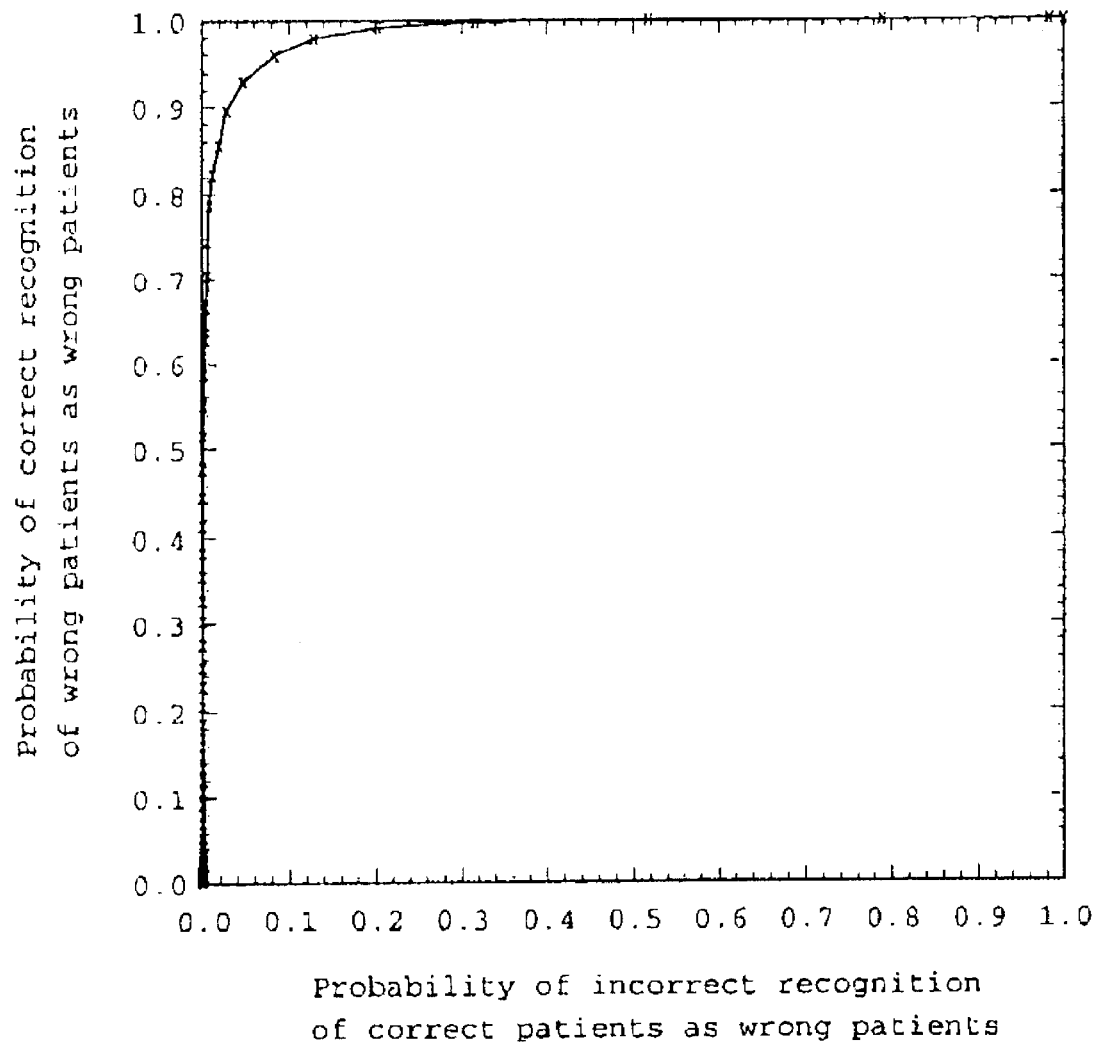
FIG. 3 is a graph illustrating an ROC curve for a patient recognition system for identifying patients by using an image-matching technique for comparison with previous chest radiographs according to the method of FIG. 1.

FIG. 3 is a graph illustrating the overall performance of the present invention in identifying wrong patients based on the image-matching technique in terms of a receiver operating characteristic (ROC) curve. The ROC curve shows the relationship between the probability of identifying wrong patients correctly as wrong patients and the probability of identifying correct patients incorrectly as wrong patients, which corresponds to the fraction of true warnings and the fraction of false warnings, respectively. The curve was generated by changing the threshold of the correlation value. The curve is located very close to the upper left corner. This result indicates a high performance of the system in identifying wrong patients.

The chest radiographs used for identifying PA or lateral views of chest images according to the present invention are selected from the files of patients in the Department of Radiology at the University of Chicago, which are obtained with a Kodak Lanex Medium/OC screen-film system. Two hundred PA and two hundred lateral radiographs are digitized with a pixel size of 0.175 mm and 1024 gray levels by use of a laser scanner (Konica KFDR-S). Digitized images of 2002×2429 matrix size are subsampled to the matrix size of 286×347. Furthermore, the images are cropped to 286×286, and the matrix size is reduced to 256×256 for the present invention by bilinear interpolation. The method in the present invention has been implemented by use of, for example, a Gateway GP-450 computer.

To determine if a given image data is representative of a PA view or a lateral view, the given image date are compared with image data of template images representative of the two views. First, however, it is necessary to develop template images for that purpose.

Template images are prepared to represent different appearances of various groups of chest images, which included PA and lateral views for all patients, a PA view for small patients, and two lateral views for small or large patients. Images that are used for obtaining template images are referred to as "training" images, whereas images used for determining correlation values with templates are referred to as "testing" images.

A template datum T(x, y) at pixel location (x, y) is produced by averaging of a number of training images where I is the number of images used, as described by the following equations below:

$$T(x, y) = \frac{1}{I}\sum_{i=1}^{I} \frac{B_i(x, y) - \overline{B_i}}{b_i}$$

$$\overline{B_i} = \frac{1}{X \cdot Y}\sum_{x=1}^{X}\sum_{y=1}^{Y} B_i(x, y)$$

$$b_i = \sqrt{\frac{1}{X \cdot Y}\sum_{x=1}^{X}\sum_{y=1}^{Y} (B_i(x, y) - \overline{B_i})^2}$$

where X and Y represent the matrix size, and $\overline{B_i}$ and $b_i$ are the mean and the standard deviation, respectively, of the ith training image. Note that the mean value of the template is zero, and the auto-correlation value of the template itself is normalized to 1.0.

A correlation value C, which indicates the extent of the similarity between the testing image and the template, is determined as described by the following equation below:

$$C = \frac{1}{X \cdot Y} \sum_{x=1}^{X} \sum_{y=1}^{Y} \frac{(B(x,y) - \overline{B})(T(x,y) - \overline{T})}{b \cdot t}$$

where $\overline{T}$ and $t$ are the mean and the standard deviation, respectively, of the template $T(x, y)$, and $\overline{B}$ and $b$ are the mean and the standard deviation, respectively, of the testing image $B(x, y)$. The correlation value ranges from −1.0 to 1.0. The largest correlation value of 1.0 is obtained, when the normalized testing image is identical to the normalized template. The smallest correlation value of −1.0 is obtained when the normalized testing image is equal to the negative value of the normalized template, namely, when two images are inversely related. The correlation value of 0 indicates the weakest correlation or no correlation between the template and the testing image. Therefore, by comparison of the correlation values between a testing image and respective templates for the PA and lateral views, the testing image can be considered to be of the type of image corresponding to the template that provided a greater correlation value.

Figure 4:
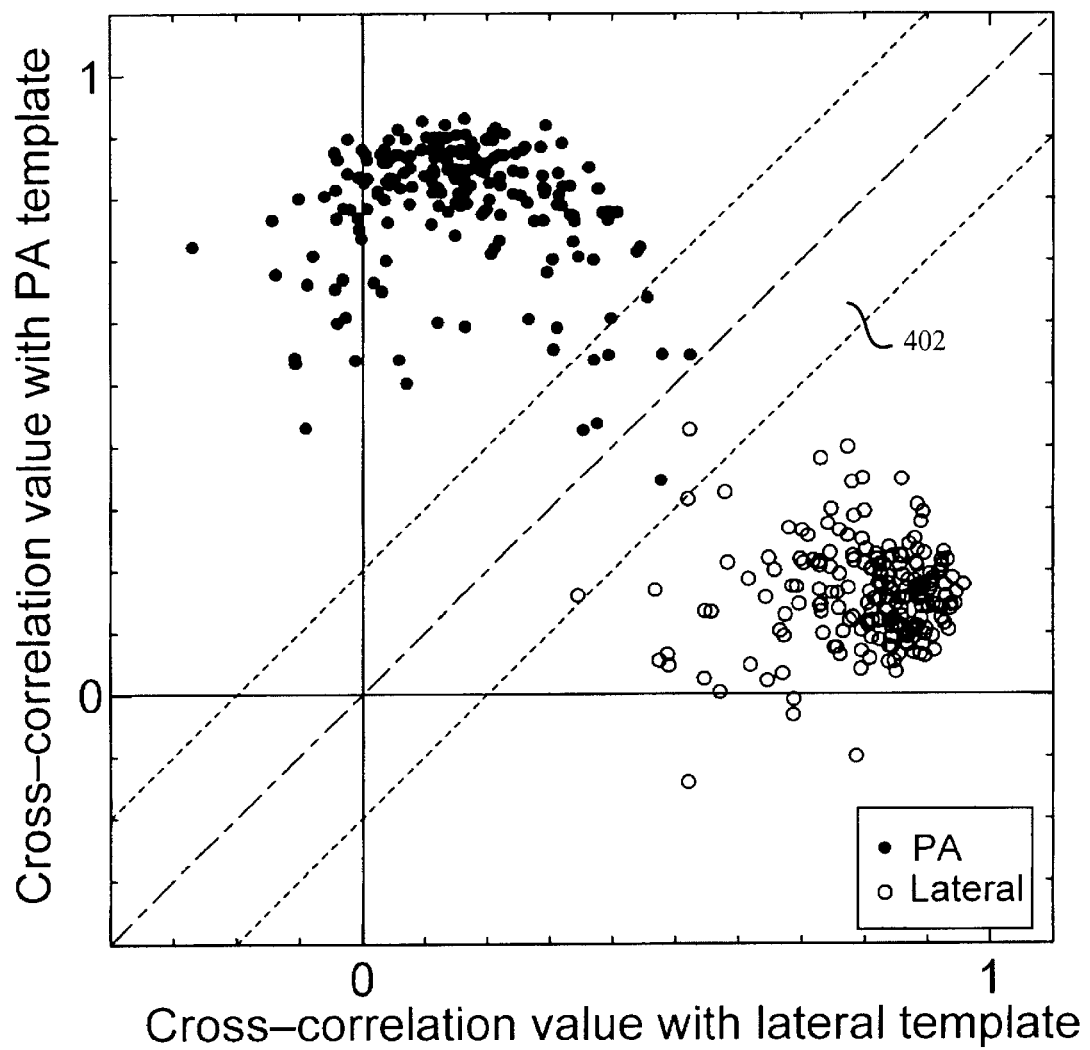
FIG. 4 is a graph illustrating correlation values obtained for all chest images with two templates of PA and lateral views with a 256×256 matrix size.

The correlation values obtained for all chest images with two templates of PA and lateral views with 256×256 matrix size are shown in FIG. 4. For this initial study, all chest images are used for both training and testing. However, testing images are selected later only from those images that are not used for training, when the number of training images required for producing the templates are examined. It is apparent in FIG. 4 that the correlation values with PA testing images are generally greater with the PA template than with the lateral template, and vice versa. Because the majority of chest images are similar to the PA or lateral template, the differences in the correlation values with the PA and lateral templates are relatively large, and are commonly larger than 0.2.

However, the correlation values for several images with PA and lateral templates are very similar, as shown in FIG. 4. Because the differences in the correlation values for these images are so small, the images typically cannot be correctly and reliably identified as PA or lateral views. The area 402 between the two dotted diagonal lines in FIG. 4 indicates the region where the difference between correlation values with PA and lateral templates is less than 0.2, which is considered in the present invention as indicating that the resemblance of a testing image with the PA or lateral template typically can not be confirmed with confidence.

Figure 5:
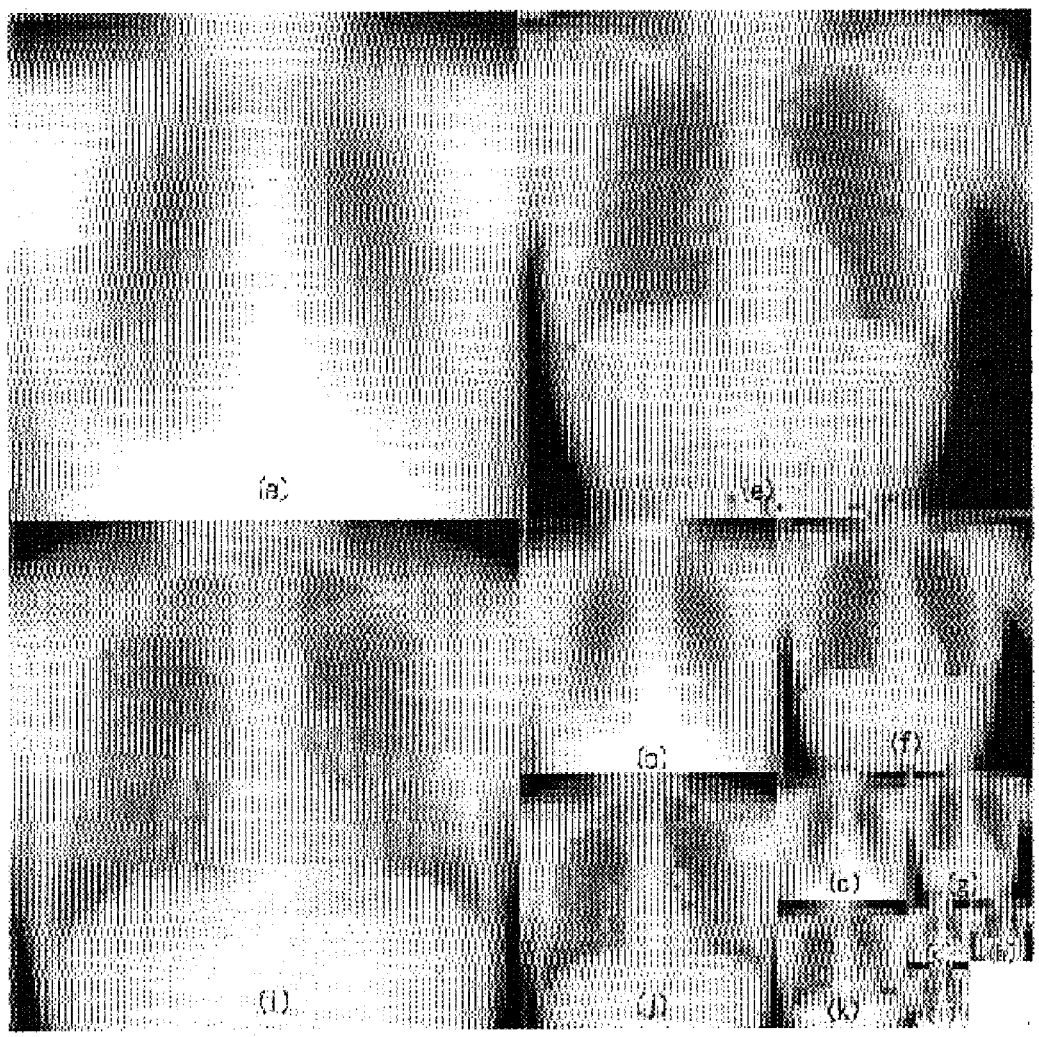
FIG. 5 is an image illustrating templates and chest images for a PA view including templates (a, b, c and d), a chest image for a small patient (e, f, g and h) and a chest image for an average-size patient (i, j, k and l) at four different matrix sizes (i.e., 64×64, 32×32, 16×16, and 8×8), respectively.

FIG. 5 is an image illustrating templates and chest images for a PA view including templates (a, b, c and d), a chest image for a small patient (e, f, g and h) and chest image for an average-size patient (i, j, k and l) at four different matrix sizes (i.e., 64×64, 32×32, 16×16, and 8×8), respectively.

Figure 6:
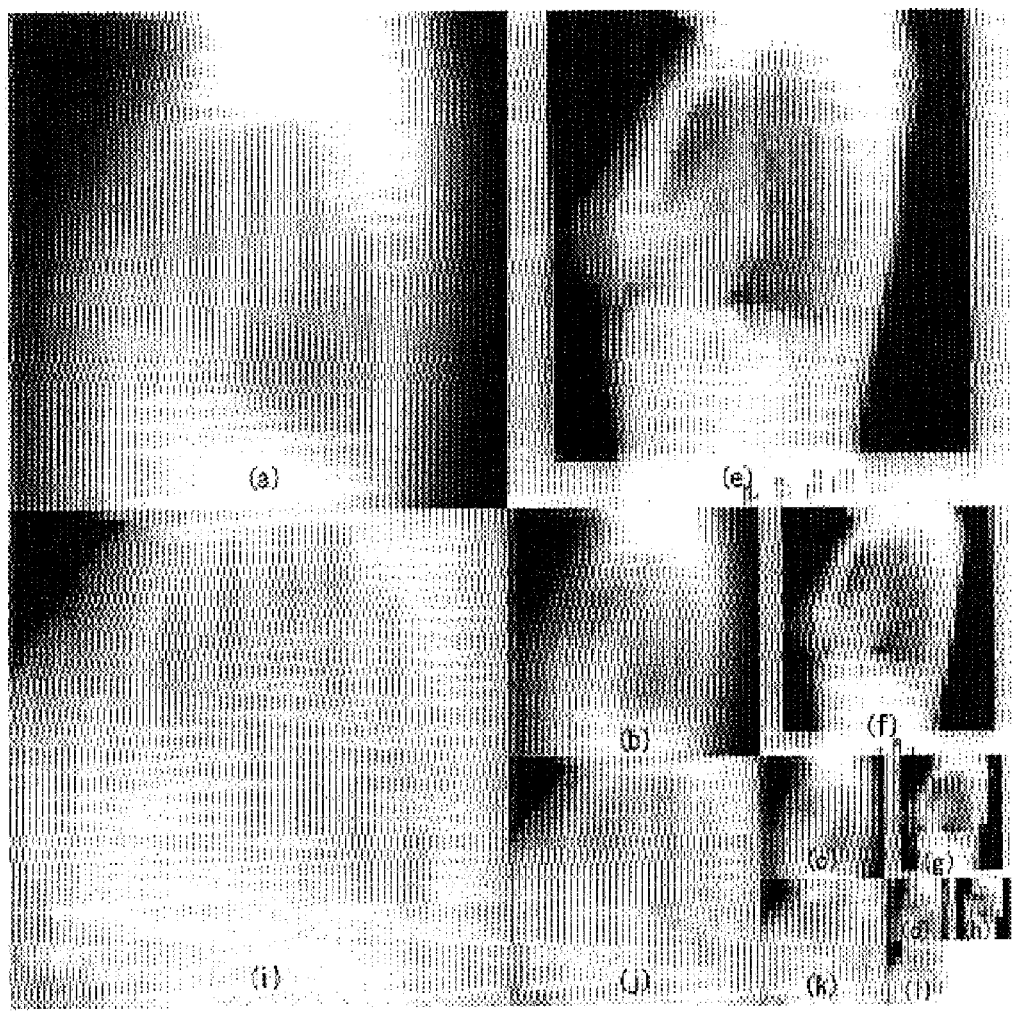
FIG. 6 is an image illustrating templates and chest images for a lateral view including templates (a, b, c and d), a chest image for a small patient (e, f, g and h) and chest image for an average-size patient (i, j, k and l) at four different matrix sizes (i.e., 64×64, 32×32, 16×16, and 8×8), respectively.

FIG. 6 is an image illustrating templates and chest images for a lateral view including templates (a, b, c and d), a chest image for a small patient (e, f, g and h) and chest image for an average-size patient (i, j, k and l) at four different matrix sizes (i.e., 64×64, 32×32, 16×16, and 8×8), respectively.

The ten images included in the region 402 of FIG. 4 were analyzed as to the reasons why these are not reliably identifiable, in contrast with the 390 (97.5%) other images which were correctly identified. It is found that unidentifiable PA chest images typically are due to patients who are small compared with the PA template, and unidentifiable lateral chest images typically are due to patients who are either small or large compared with the lateral template. In addition, the correlation value for one PA case with the lateral template, which is a wrong template, is larger than that with the PA template. Therefore, the variation in patient size typically is a major cause for a decrease in the correlation values. With the chest image database used, the PA chest images for large patients were correctly identified by the PA template, and did not require another PA template for large patients, even though the increased size of large patients was recognizable in these PA chest images. However, a PA template for large patients may be prepared and may increase overall image identification performance when applied to other image databases.

Consequently, with the database used, three additional templates which can represent a PA view for small patients, a lateral view for small patients, and a lateral view for large patients were produced. The correlation values between the unidentifiable ten images and the three templates are shown in Table 1.

TABLE 1

Correlation values between chest image and three additional templates for small or large patients for unidentifiable ten images.

| Chest Image (PA or lateral) | PA template for small patients | Lateral template for small patients | Lateral template for large patients |
|---|---|---|---|
| PA | 0.858 | 0.357 | 0.352 |
| PA | 0.620 | 0.318 | 0.401 |
| PA | 0.915 | 0.436 | 0.424 |
| PA | 0.814 | 0.406 | 0.329 |
| PA | 0.642 | 0.401 | 0.252 |
| PA | 0.727 | 0.499 | 0.379 |
| PA | 0.832 | 0.493 | 0.491 |
| PA | 0.880 | 0.486 | 0.409 |
| lateral | 0.047 | 0.421 | 0.220 |
| lateral | 0.284 | 0.403 | 0.629 |

From Table 1, it is apparent that each of the images has the greatest correlation value with the correct template. All images unidentifiable with the two initial templates were correctly identified when the three additional templates for different-size patients were used. Therefore, all of the 400 images used in the present invention were correctly identified with five templates prepared for patients of different size.

A horizontal shift in patient position is found to be a cause for a decrease in the correlation values for some images of small patients. It is possible to obtain the maximum correlation value for unidentifiable images by shifting the PA and lateral templates horizontally in the case of small patients. However, the correlation values do not greatly increase compared with those obtained with the additional templates.

To summarize the results above, either PA or lateral views of chest radiographs can be identified accurately and automatically by examination of the correlation values of a chest image with a number of templates in two steps. In a first processing step, two correlation values for an unknown case are determined by use of PA and lateral templates that represent two different views of all adult chest images in a large population. If the correlation value with one template is greater, for example, by more than 0.2, than that with another template, then the chest image is considered to belong to the view of that template with a greater correlation value. If not, the chest image is considered as unidentifiable in the first processing step, and further analysis is required. In the second processing step, the correlation values of the unidentifiable case are determined by use of three additional templates that represent the PA view for small patients, the lateral view for small patients, and the lateral view for large patients. The correct view is considered to be the one yielding the greatest correlation value among the three templates.

In the present invention, the unidentifiable region in FIG. 4 is determined by use of the value of 0.2, which corresponds to the difference between correlation values with the PA and lateral view templates. Typically, it is important to select a proper difference value for the present invention, since a large difference value tends to increase unnecessarily the number of unidentified images, which increases the computation time for the subsequent processing step. However, a small difference value may not be able to pick up all of the incorrect or unidentifiable images in the first processing step, and then would reduce the overall accuracy of this method. Therefore, one should be cautious not to use difference values that are too small. Note that the difference value of 0.2 is determined empirically by considering these factors in the present invention.

The proper selection of an image matrix size for this method typically is also important, because a large matrix size requires a long computation time, and a small matrix size may decrease the accuracy in the identification of correct views. The smallest matrix size required for the template matching technique, and the correlation values between the testing images and the templates are determined for various image matrix sizes. The images of 256×256 matrix size were reduced to matrix sizes of 128×128, 64×64, 32×32, 16×16, 8×8, 4×4, and 2×2 by use of a subsampling technique. The results obtained with the subsampling technique were almost the same as those obtained with an averaging technique.

Figure 7:
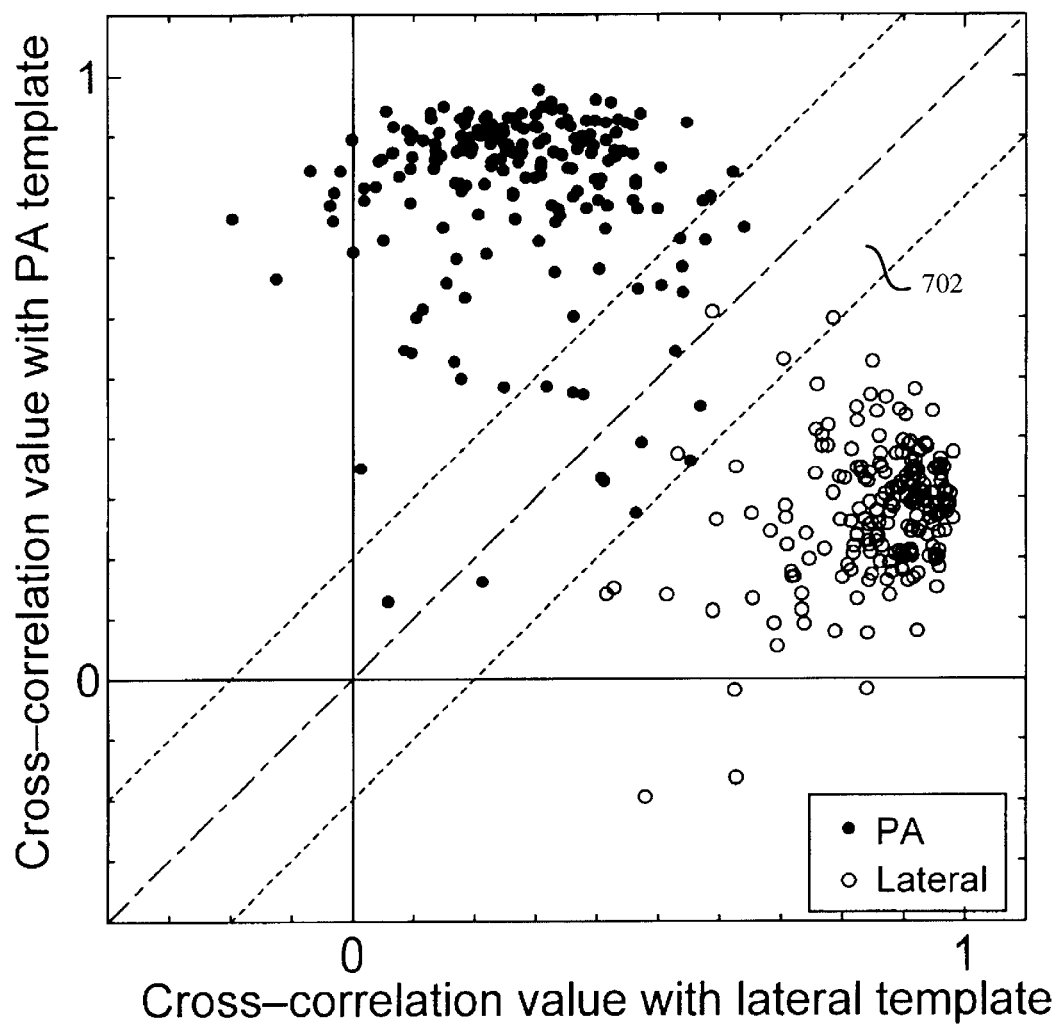
FIG. 7 is a graph illustrating correlation values between all images and two templates for PA and lateral views of chest images with a 4×4 matrix size.

FIG. 7 is a graph illustrating the distribution of the correlation values obtained with the 4×4 matrix size. It is seen that the number of unidentifiable images in the area 702 between the two dotted lines increased considerably compared with the area 402 shown in FIG. 4.

Figure 8:
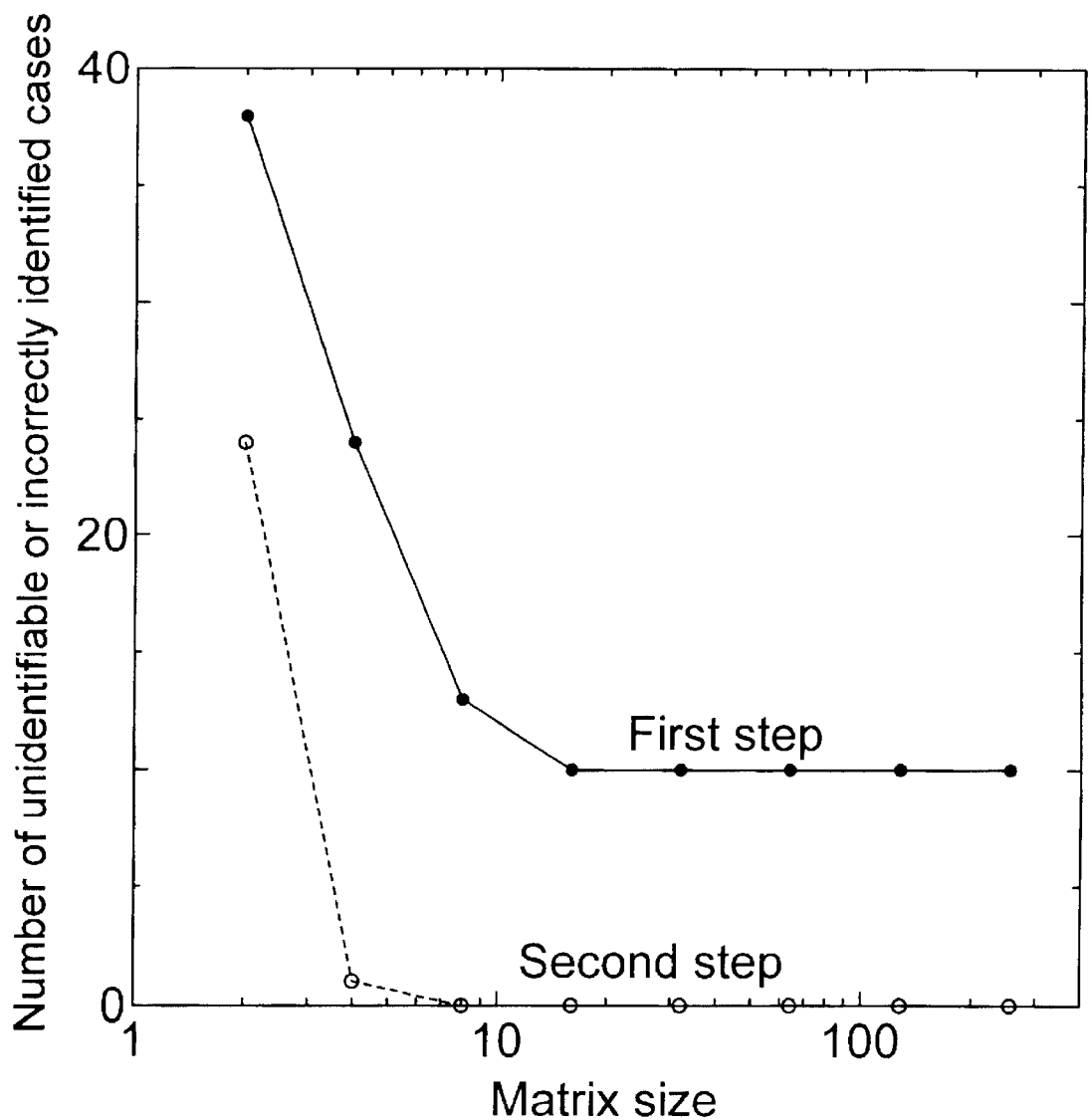
FIG. 8 is a graph illustrating the effect of the image matrix size on the number of unidentifiable images in a first processing step and the number of incorrectly identified images in a second processing step for distinction between PA and lateral views of chest images.

FIG. 8 is a graph illustrating the relationship between the image matrix size (wherein the horizontal axis represents a size of one side of a square matrix) and the number of unidentifiable images in the first processing step and incorrectly identified images in the second processing step. The number of unidentifiable or incorrectly identified images increased as the matrix size decreased. This result indicates that the smallest image matrix size for this template matching technique is 8×8. Therefore, for example, a 16×16 matrix is selected for a preferred embodiment of the present invention.

The effect of the number of training images used for producing a template is also investigated. It would be helpful if a small number of training images could produce proper templates, and could provide an accurate identification of the PA or lateral view. Various templates are prepared by use of different numbers of images, including 128, 64, 32, 16, 8, 4, 2, and 1 image, which are randomly selected from 200 images. The correlation values between the templates and all images, except the training images used for producing templates, are calculated, and the numbers of unidentifiable or incorrectly identified images are obtained.

Figure 9:
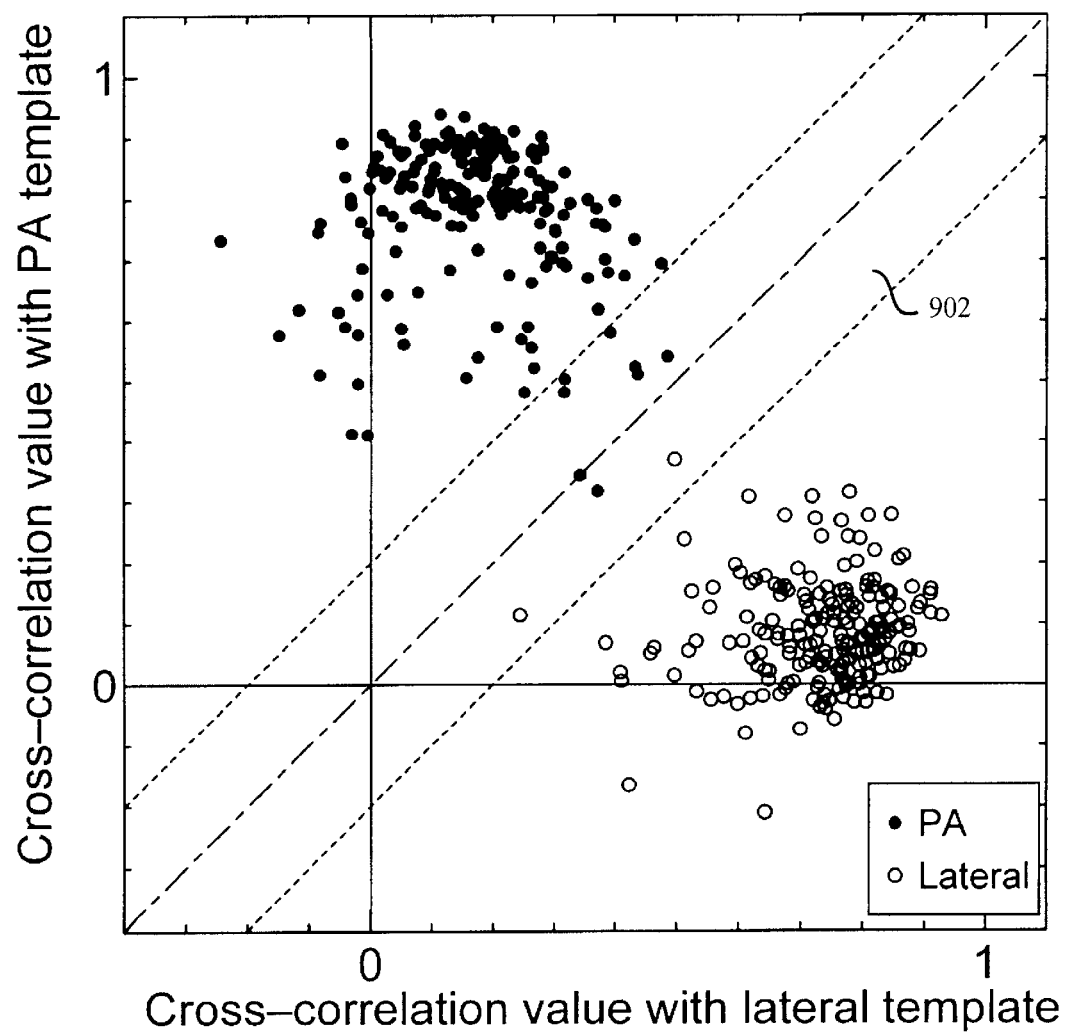
FIG. 9 is a graph illustrating correlation values between all images and a template, wherein templates are produced from 16 images randomly selected and the matrix size is 16×16.

FIG. 9 is a graph illustrating the distribution of correlation values for the template produced with 16 training images, where the matrix size of 16×16 is used. As shown in FIG. 9, the area 902 between the two dotted lines includes a number of unidentifiable images (i.e., ten).

Figure 10:
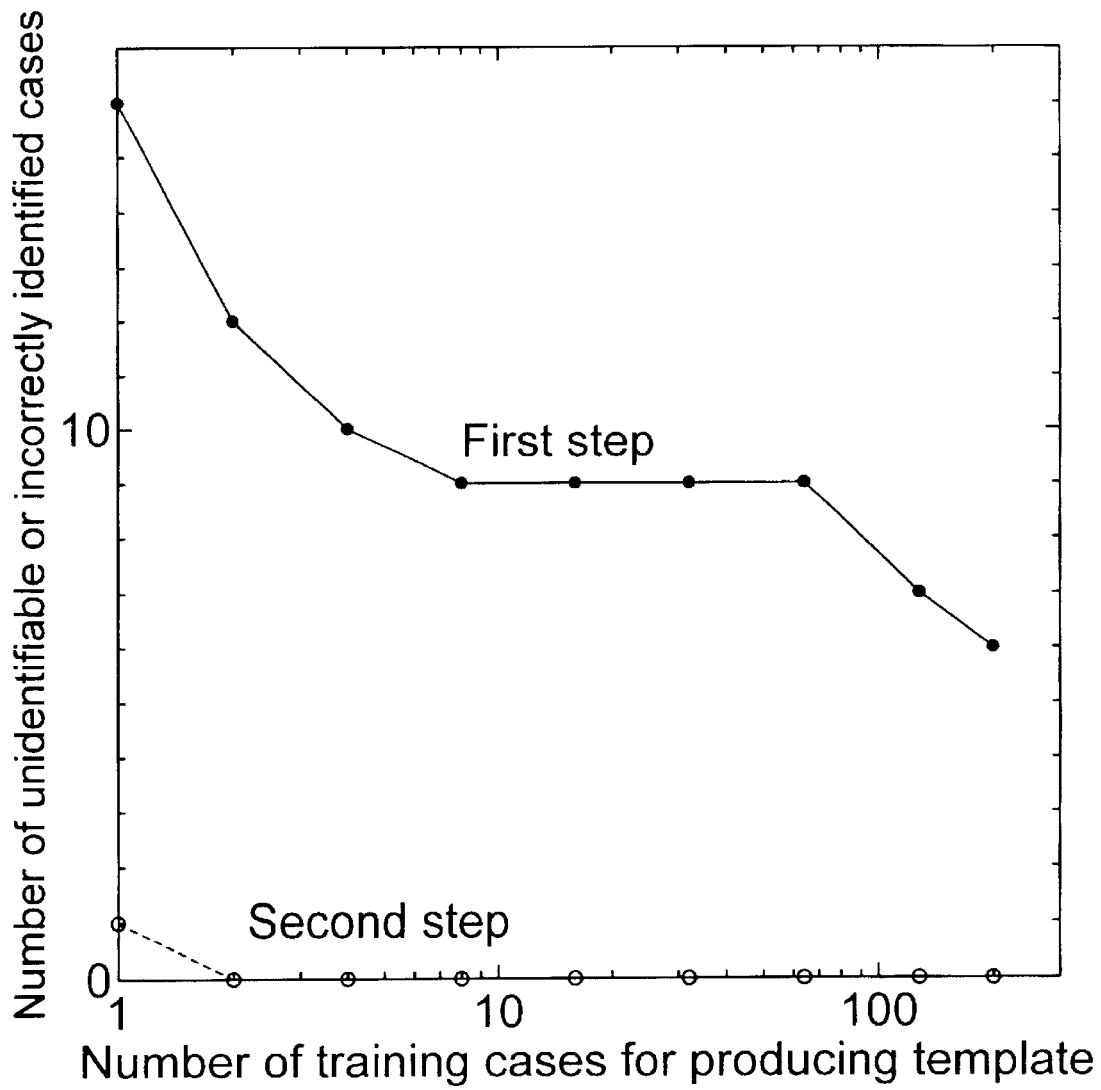
FIG. 10 is a graph illustrating the effect of the number of images used for producing a template on the number of unidentifiable images in a first processing step and the number of incorrectly identified images in a second processing step for distinction between PA and lateral views of chest images.

FIG. 10 is a graph illustrating the effect of the number of training images used for producing a template on the numbers of unidentifiable images in the first processing step and incorrectly identified images in the second processing step. As the number of training images decreases, the number of unidentifiable or incorrectly identified images increases. When the number of training images is 8 or greater, the performance is likely to be accurate. Therefore, the preferred embodiment of the present invention uses at least 16 training images for producing a template. In order to verify the result, five different templates by using five sets of 16 different images that are randomly selected are produced. With these templates, the correlation values and the number of incorrectly identified images are determined as shown in Table 2.

TABLE 2

The number of unidentifiable images in the first processing step and the number of incorrectly identified images in the second processing step, wherein five different templates are produced by use of five sets of 16 different images randomly selected and with a matrix size of 16 × 16.

|  |  | Templates |  |  |  |  |
|---|---|---|---|---|---|---|
|  |  | 1st | 2nd | 3rd | 4th | 5th |
| 1st step, | PA | 3 | 3 | 5 | 7 | 2 |
|  | lateral | 2 | 2 | 1 | 2 | 2 |
| 2nd step, | PA | 0 | 0 | 0 | 0 | 0 |
|  | lateral | 0 | 0 | 0 | 0 | 0 |

From Table 2, the number of unidentifiable images in the first processing step is different for each set, but all of the testing images are correctly identified in the second processing step. From the results above, it is concluded that the smallest matrix size is 16×16, and the minimum number of training images for producing a template is 16.

In the inventor's initial investigation, only three additional templates in the second processing step were prepared, and found to be adequate to identify correctly PA or lateral views of all of the chest radiographs in our database. However, additional templates can be prepared, such as a PA template for large patients and additional special templates for exceptional images, such as large obese patients, and also very abnormal chest images, such as patients with only one lung, patients in the intensive care unit due to disfiguring chest trauma, etc. It would be useful to incorporate these additional and special templates in the second processing step for correct identification of corresponding chest images, if such images are included in a given image database. In fact, the method was applied to 247 PA chest images in a chest image database [10] were available from the Japanese Society of Radiological Technology. All of these images were correctly identified as PA views by the method described above. However, the correlation values for some chest images with large obese patients were very low in the range below 0.3. A special template was then prepared for these exceptionally large patients. It was confirmed subsequently that the corresponding correlation values increased substantially in the range above 0.6, thus indicating the usefulness of the additional special template.

However, when chest radiographs for small patients were obtained, the x-ray beam incident on the patient is commonly narrowed to the upper body area of the patient by use of a collimator, thus resulting in a chest radiograph with unexposed light areas on the edge portions of the radiograph. This type of artifact gives an appearance of a "white frame" attached to the chest image, and can result in a decrease in the correlation value with the template. Similar artifacts may be produced in the process of digitization of chest radiographs by use of a laser scanner, although the size (or width) of the corresponding artifacts is usually much smaller than that due to the x-ray beam collimation. The undesirable effect of these artifacts on the correlation value can be reduced by use of a smaller matrix of chest images by eliminating some pixels on edges of chest images as described below.

When the matrix size for chest images and templates is 16×16, a smaller matrix image with reduced artifacts can be obtained by eliminating all of the outermost pixels on four edges of a chest image, thus producing a 14×14 matrix. By repeating the elimination of all the outermost pixels on the 14×14 matrix images and so on, one can obtain images with different matrix sizes of 12×12 and 10×10, which include different widths of edge portion removed on the original chest images.

Figure 11:
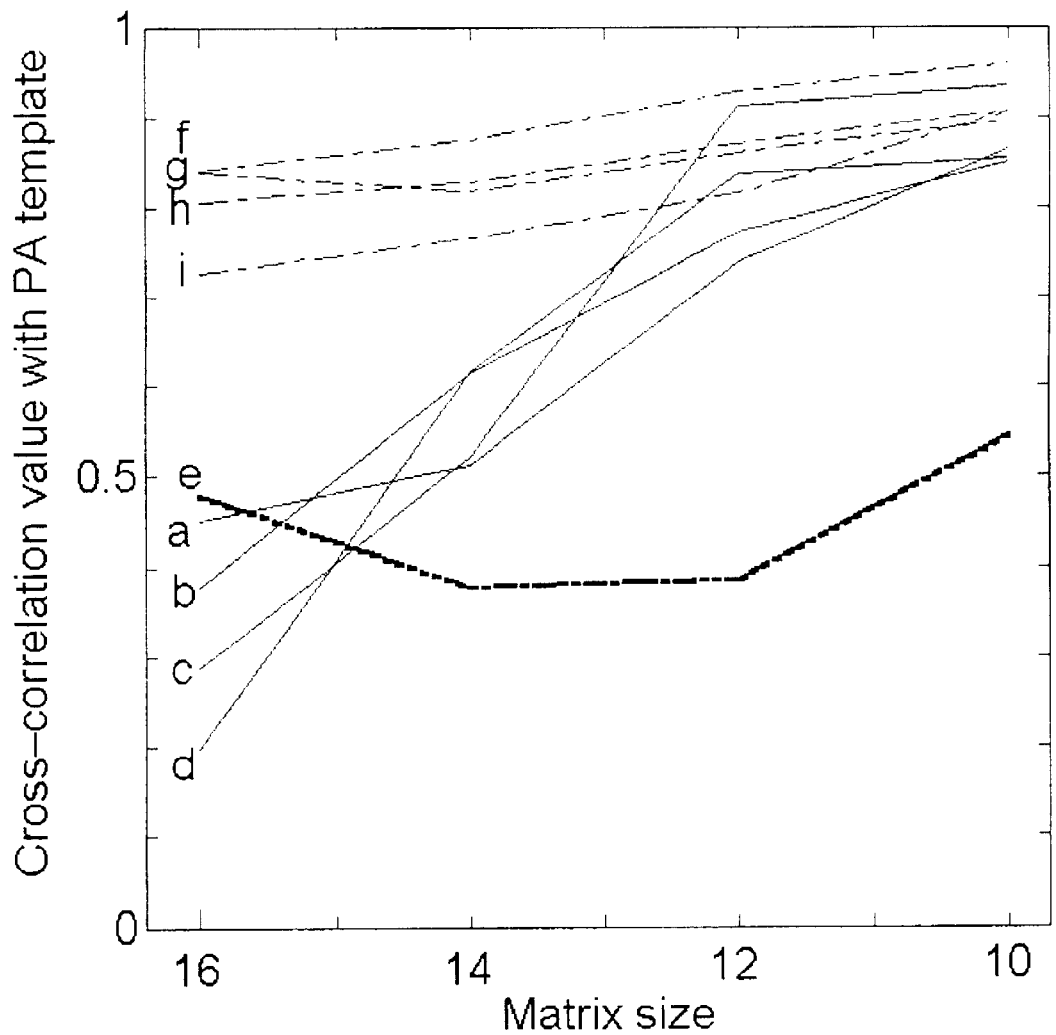
FIG. 11 is a graph illustrating the effect of reduced matrix size on correlation values for chest images with and without artifacts on surrounding edges of PA chest images.

FIG. 11 is a graph illustrating the effect of the reduced matrix size (wherein the horizontal axis represents a size of one side of a square matrix) on the correlation values for chest images with and without artifacts on the surrounding edges of PA chest images. The correlation values with a 16×16 matrix for four chest images with artifacts (a, b, c, and d) are very low in the range less than 0.5. It is apparent from FIG. 11 that the correlation values for these images increased rapidly as the matrix size was reduced to 14×14 and 12×12, and tended to be saturated at the matrix size of 10×10. However, the correlation value for one chest image with artifacts (e) does not change much for the matrix size from 16×16 to 10×10. This result is due to the fact that the patient size in this chest image is very small. In fact, the correlation value with the PA template for small patients increased to 0.651 for the chest image with artifacts (e), and thus is correctly identified as a PA view. The correlation values with a 16×16 matrix for four chest images without artifacts (f, g, h, and i) are very large and do not change much with reduced matrix sizes.

These findings indicate that when the correlation value of an unknown chest image with a 16×16 matrix size is very small, such as less than 0.5, the correlation value with a reduced matrix size, such as a 12×12 matrix, should be determined. If the corresponding correlation value with the reduced matrix size increases substantially, then the correct view of this chest image can be identified by the view of the template used. However, if the corresponding correlation value does not change much, then it is necessary to apply other templates with different views and/or different patient sizes.

FIG. 12a is a flow chart illustrating an overall scheme for correctly identifying either PA or lateral views of chest radiographs. In FIG. 12a, at step 1200, a chest image is obtained and a matrix size thereof is reduced, as previously described. At step 1202, templates are obtained for (i) PA view, (ii) lateral view, (iii) small patient PA view, (iv) small patient lateral view, (v) large patient PA view and (vi) large patient lateral view, as previously discussed.

At step 1204, corresponding to the first processing step, correlation values CV1 and CV2 for unknown images are calculated using (i) the PA view template and (ii) the lateral view template, respectively. At step 1206, if the difference between CV1 and CV2 is greater than a predetermined threshold TH1 (e.g., 0.2), then the unknown images are determined to be PA views. If the difference between CV2 and CV1 is greater than the predetermined threshold TH1 (e.g., 0.2), then the unknown images are determined to be lateral views. Otherwise the unknown images are considered undetermined images.

At step 1208, corresponding to the second processing step, correlation values CV3, CV4, CV5 and CV6 for the undetermined images are calculated using (iii) the small patient PA view template, (iv) the small patient lateral view template, (v) the large patient PA view template and (vi) the large patient lateral view template, respectively. At step 1210, the correct view for the undetermined images is determined to be the view yielding the largest correlation value among the values CV3, CV4, CV5 and CV6 corresponding to (iii) the small patient PA view template, (iv) the small patient lateral view template (v) the large patient PA view template and (vi) the large patient lateral view template, respectively. Otherwise the undetermined images remain undetermined.

FIG. 12b is a flow chart illustrating an optional artifact processing procedure, as previously discussed. In FIG. 12b, at step 1212, if the calculated correlation value CVx (i.e., CV1, CV2, CV3, CV4, CV5 and CV6) for unknown images of a given matrix size (e.g., 16×16) is less than a predetermined threshold TH2 (e.g., 0.5), then CVx is re-calculated using a smaller matrix size (e.g., 12×12) to obtain CVxs.

At step 1214, if the re-calculated correlation value CVxs (i.e., CV1s, CV2s, CV3s, CV4s, CV5s and CV6s) for the unknown images of the smaller matrix size (e.g., 12×12) substantially increases from the predetermined threshold TH2 (i.e., CVxs>>0.5), then the correct view corresponds to the template used in re-calculating CVx to obtain CVxs. Otherwise, the process returns to the calling routine (e.g., step 1204 or step 1208).

Figure 13:
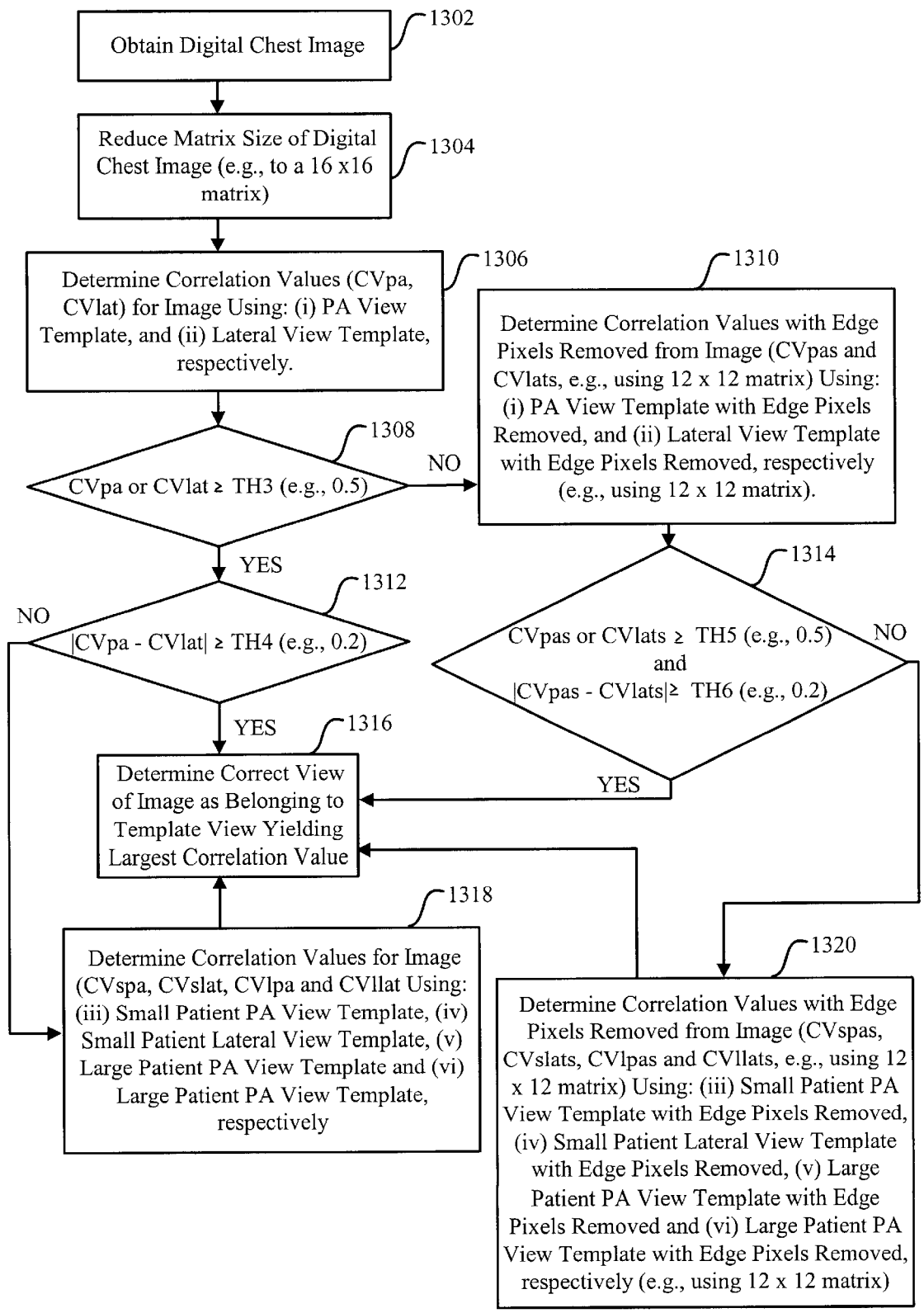
FIG. 13 is a flow chart illustrating an overall scheme for correctly identifying either PA or lateral views of chest radiograph, according to another embodiment of the present invention.

FIG. 13 is a flow chart illustrating an overall scheme for correctly identifying either PA or lateral views of chest radiographs according to another embodiment. In FIG. 13, at step 1302, a digital chest image of an unknown view is obtained. At step 1304, the digital image is reduced in size (e.g., to a 16×16 matrix) using, for example, cropping, interpolation, subsampling, etc., techniques. At step 1306, correlation values (CVlat and CVpa) between the reduced image and corresponding image size lateral view and PA view templates are determined, respectively. At step 1308, it is determined whether the correlation values CVlat or CVpa is greater than or equal to a predetermined threshold value TH3 (e.g., 0.5). If CVlat or Cvpa is greater than or equal to TH3, at step 1312, it is determined if |CVpa−Cvlat| is greater than or equal to a predetermined threshold TH4 (e.g., 0.2).

If |CVpa−Cvlat| is greater than or equal to the predetermined threshold TH4 (e.g., 0.2), at step 1316, the correct view for the image is determined as belonging to the template view yielding the largest correlation value amongst CVpa and CVlat. If |CVpa−CVlat| is not greater than or equal to the predetermined threshold TH4 (e.g., 0.2), correlation values (CVspa, CVslat, CV1pa and CV1lat) between the reduced image and corresponding image size small patient PA view, small patient lateral, large patient PA view and large patient lateral view templates are determined, respectively, at step 1318. Then, processing returns to step 1316, wherein the correct view for the image is determined as belonging to the template view yielding the largest correlation value amongst CVspa, CVslat, CV1pa and CV1lat.

If neither CVlat or CVpa are greater than or equal to TH3, artifact removal (e.g., using edge pixel removal) processing is performed at step 1310. At step 1310, correlation values (CVpas and CVlats) between the image with edge pixels removed (e.g., using a 12×12 matrix) using a PA view and a lateral view template with edge pixels removed (e.g., using a 12×12 matrix) are determined. Then, at step 1314, it is determined whether the correlation values CVpas or CVlats is greater than or equal to a predetermined threshold value TH5 (e.g., 0.5) and whether |CVpas−Cvlats| is greater than or equal to a predetermined threshold TH6 (e.g., 0.2). If both of these conditions are met, processing returns to step 1316, wherein the correct view for the image is determined as belonging to the template view yielding the largest correlation value amongst CVpas and CVlats.

If correlation values CVpas or CVlats is not greater than or equal to the predetermined threshold value TH5 (e.g., 0.5)

or if |CVpas−Cvlats| is not greater than or equal to the predetermined threshold TH6 (e.g., 0.2), further processing is performed at step 1320. At step 1320, correlation values (CVspas, CVslats, CV1pas and CV1lats) between the reduced image and corresponding large image size small patient PA view, small patient lateral, large patient PA view and large patient lateral view templates are determined, respectively. Then, processing returns to step 1316, wherein the correct view for the image is determined as belonging to the template view yielding the largest correlation value amongst CVspas, CVslats, CV1pas and CV1lats.

Figure 14:
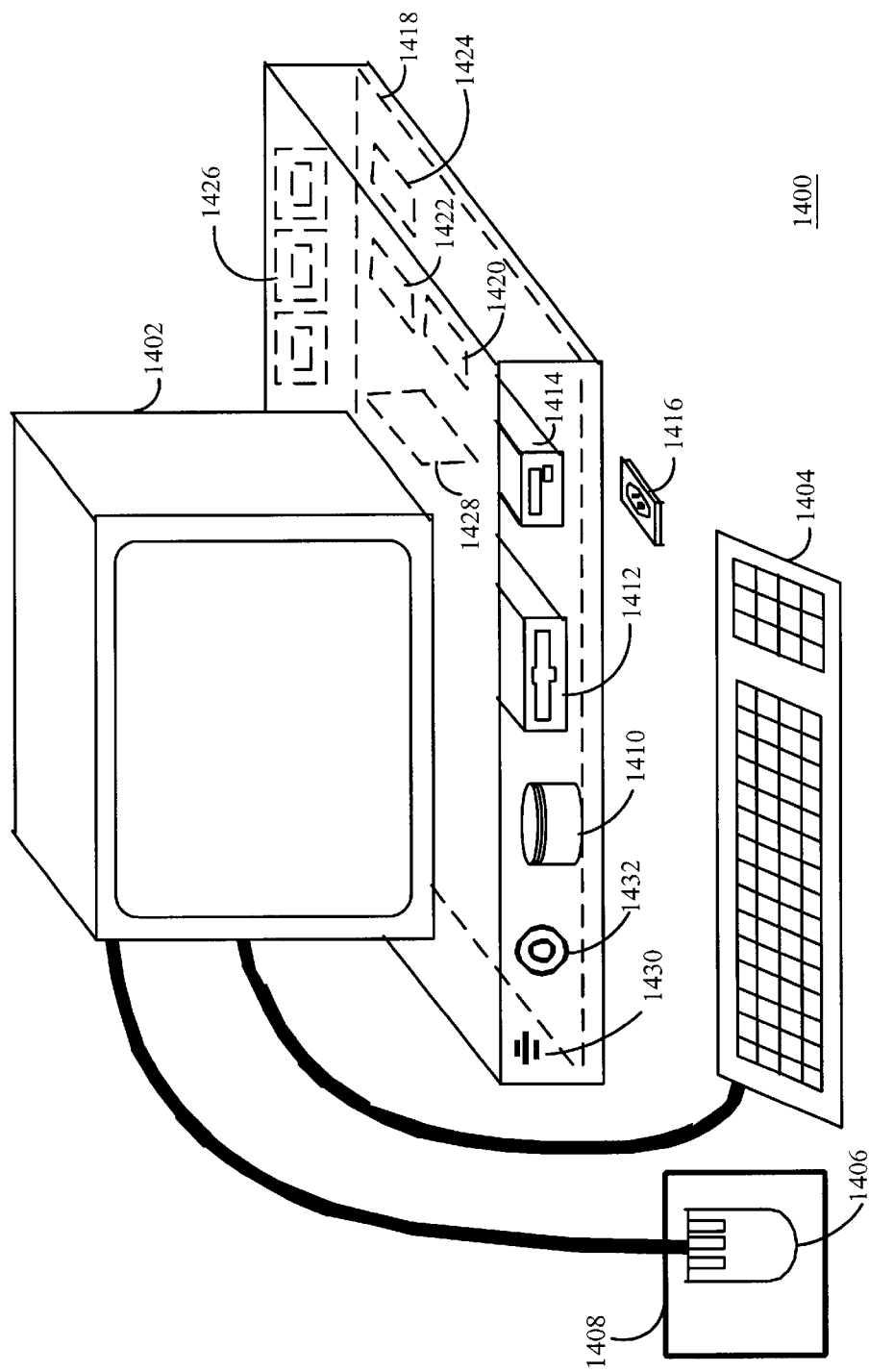
FIG. 14 is a schematic illustration of a general purpose computer which can be programmed according to the teachings of the present invention.

FIG. 14 is a schematic illustration of a general purpose computer 1400 which can be programmed according to the teachings of the present invention. In FIG. 14, the computer 1400 implements the processes of the present invention, wherein the computer includes, for example, a display device 1402 (e.g., a touch screen monitor with a touchscreen interface, etc.), a keyboard 1404, a pointing device 1406, a mouse pad or digitizing pad 1408, a hard disk 1410, or other fixed, high density media drives, connected using an appropriate device bus (e.g., a SCSI bus, an Enhanced IDE bus, an Ultra DMA bus, a PCI bus, etc.), a floppy drive 1412, a tape or CD ROM drive 1414 with tape or CD media 1416, or other removable media devices, such as magneto-optical media, etc., and a mother board 1418. The mother board 1418 includes, for example, a processor 1420, a RAM 1422, and a ROM 1424 (e.g., DRAM, ROM, EPROM, EEPROM, SRAM, SDRAM, and Flash RAM, etc.), I/O ports 1426 which may be used to couple to an image acquisition device and optional special purpose logic devices (e.g., ASICs, etc.) or configurable logic devices (e.g., GAL and re-programmable FPGA) 1428 for performing specialized hardware/software functions, such as sound processing, image processing, signal processing, neural network processing, automated classification, etc., a microphone 1430, and a speaker or speakers 1432.

As stated above, the system includes at least one computer readable medium. Examples of computer readable media are compact discs, hard disks, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 1400 and for enabling the computer 1400 to interact with a human user. Such software may include, but is not limited to, device drivers, operating systems and user applications, such as development tools. Such computer readable media further includes the computer program product of the present invention for performing any of the processes according to the present invention, described above. The computer code devices of the present invention can be any interpreted or executable code mechanism, including but not limited to scripts, interpreters, dynamic link libraries, Java classes, and complete executable programs, etc.

The programming of general purpose computer 1400 is implemented to process digital data derived from images obtained from, for example, a picture archive communication system (PACS). Alternatively, the present invention can also be implemented by programming of general purpose computer 1400 to include a software module for digitizing and storing images obtained from an image acquisition device. In other words, the digital images being processed may not be in existence in digital form and may need to be converted to digital form in practicing the invention.

Accordingly, the mechanisms and processes set forth in the present description may be implemented using a conventional general purpose microprocessor or computer programmed according to the teachings in the present specification. Appropriate software coding can readily be prepared by programmers of ordinary skill in the computer art(s) based on the teachings of the present disclosure. However, the present invention also may be implemented by the preparation of application-specific integrated circuits or by interconnecting an appropriate network of conventional component circuits.

The present invention thus also includes a computer-based product which may be hosted on a storage medium and include instructions which can be used to program a general purpose microprocessor or computer to perform processes in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Recapitulating, for many images stored in a picture archiving and communication system (PACS), it is important that images are stored in correct locations, such as in the proper patients' folders. However, if the patient information associated with an image, such as the identification number or the patient name, has been entered incorrectly, it is difficult to find this error. During routine image interpretation, it is not uncommon that radiologists occasionally recognize a wrong patient's image which is displayed in a series of images for a given patient. It is, therefore, desirable to discover a wrong patient's image immediately after the patient ID is attached to the image that is obtained with an image-acquisition system, so that corrective action can be taken before the wrong image is stored in the wrong patient folder. In one embodiment, the present invention focuses on chest radiographs in the PACS environment and implements an automated method to identify patients by using an image-matching technique in which current and previous chest radiographs are compared. The goal of this approach is to alert technologists or radiology personnel when a current image that does not match previous chest radiographs of a given patient in the PACS environment. To identify such a mismatch, cross-correlation value between a current image and a previous image are determined. The current image is shifted horizontally and vertically and is then rotated in order to determine a best match between the two images. Employed are 2000 chest radiographs (e.g., posteroanterior views), which were obtained for 1000 patients for whom current and previous images were available. It was found that the correlation values between previous and current images for the same patient were generally greater than those for different patients. Preliminary results indicated that more than 50% of mismatched, "wrong" images can be identified correctly with the method according to the present invention. This automated method for patient identification would be useful in locating wrong images being stored in the PACS environment.

According to another embodiment of the present invention, in picture archiving and communications systems (PACS) or digital archiving systems, information identifying the image view, posteroanterior (PA) or lateral, for chest radiographs is often not recorded or is recorded incorrectly. However, it is necessary to identify whether the view is the PA view or the lateral view correctly for quantitative analysis of chest images for computer-aided diagnosis. The present invention provides a computerized method for correctly identifying either PA or lateral views of chest radiographs. The overall approach is to examine the similarity of a chest image with templates that represent average chest images of the PA or lateral view. By use of a template matching technique, correlation values are obtained for determining whether a chest image is either a PA or a lateral view. The templates for PA and lateral views are prepared from 200 PA and 200 lateral chest images. In a first processing step, 390 (97.5%) of the images are correctly identified by comparison of the correlation values obtained with the two templates. From a detailed analysis of 10 unidentifiable images in the first processing step, it is found that the variation in patient size typically is a major cause for a reduction in the correlation values. Therefore, three additional templates for small patients with PA and lateral views and large patients with lateral views are used. In a second processing step, the correlation values with the additional three templates are compared and all of the remaining unidentifiable images (2.5%) are identified correctly. The smallest matrix size that typically can be used with this method is 16×16 and at least 16 images typically should be used for producing templates. However, as previously noted, additional templates can be prepared, such as a PA template for large patients and additional special templates for exceptional images, such as large obese patients, and also very abnormal chest images, such as patients with only one lung, patients in the intensive care unit due to disfiguring chest trauma, etc., which may increase overall image identification performance when applied to other image databases.

Although the present invention is described in terms of identifying PA and lateral views on radiographic images, the present invention can be implemented for identifying other images, such as abdominal images, images of skulls, images of extremities, CT images, ultrasound images, MRI images, etc., in which a computerized analysis of medical images is performed.

Although the present invention is described in terms of identifying PA and lateral views on radiographic images using templates for, PA view, lateral view, small patient PA view, small patient lateral view, large patient PA view, large patient lateral view, and obese patient PA view, the present invention can be implemented using other special templates, such as obese patient lateral view, very abnormal chest images, such as patients with only one lung, patients in the intensive care unit due to disfiguring chest trauma, etc.

Although the present invention is described in terms of using a reduced matrix size by eliminating edge pixels for artifact removal, the present invention can be implemented using a reduced matrix size by eliminating edge pixels to reduce computation time.

Although the present invention is described in terms of using a reduced matrix size by eliminating edge pixels for artifact removal, the present invention can be implemented using a reduced matrix size by eliminating edge pixels to reduce computation time.

Although the present invention is described in terms of reducing matrix size by using, for example, subsampling and bilinear interpolation techniques to reduce computation time, the present invention can be implemented using a reduced matrix size using, for example, subsampling and bilinear interpolation techniques to further reduce computation time as may be appropriate for a particular use of an image being identified.

Numerous modifications and variations of the present invention are possible in light of the above teachings. It is therefore to be understood that within the scope of the appended claims, the invention may be practiced otherwise than as specifically described herein.

List of References

[1]. Xu X W, Doi K, Kobayashi T, MacMahon H, Giger M L: Developement of an improved CAD scheme for automated detection of lung nodules in digital chest images. Med Phys 24: 1395–1403, 1997.

[2]. Xu X-W, Katsuragawa S, Ashizawa K, MacMahon H, Doi K: Analysis of image features of histograms of edge gradiant for false positive reduction in lung nodule detection in chest radiographs. Proc SPIE 3338: 318–326, 1998.

[3]. Katsuragawa S, Doi K, MacMahon H, Monnier-Cholley L, Morishita J, Ishida T: Quantitative analysis of geometric-pattern features of interstitial infiltrates in digital chest radiographs. J Dig Imaging 9: 137–144, 1996.

[4]. Ishida T, Katsuragawa S, Ashizawa K, MacMahon H, Doi K: Application of artificial neural networks for quantitative analysis of image data in chest radiographs for detection of interstitial lung disease. J Dig Imaging 11: 182–192, 1998.

[5]. Kano A, Doi K, MacMahon H, Hassell D D, Giger M L: Digital image subtraction of temporally sequential chest images for detection of interval change. Med Phys 21: 453–461, 1994.

[6]. Ishida T, Katsuragawa S, Nakamura K, MacMahon H, Doi K: Iterative image warping technique for temporal subtraction of sequential chest radiographs to detect interval change. Med Phys 26: 1320–1329, 1999.

[7]. Armato S G, Giger M L, MacMahon H: Automated lung segmentation in digitized posteroanterior chest radiographs. Acad Radiol 5: 245–255, 1998.

[8]. Armato S G, Giger M L, Ashizawa K, MacMahon H: Automated lung segmentation in digital lateral chest raiographs. Med Phys 25: 1507–1520, 1998.

[9]. Harreld M R, Marovic B, Neu S, Valentino D J: Automatic labeling and orientation of chest CRs using neural networks. Radiology 213 (P): 321, 1999 (abstract).

[10]. Shiraishi J, Katsuragawa S, Ikezoe J, Matsumoto T, Kobayashi T, Komatsu K, Matsui M, Fujita H, Kodera Y, Doi K: Development of a digital image database for chest raiographs with and without a lung nodule: ROC analysis on raiologists' performance in detection of pulmonary nodules. AJR 174: 71–74, 2000.

What is claimed as new and desired to be secured by Letters Patent of the United States is:

1. A computer-automated method for identifying given image data, comprising:

obtaining first and second template image data corresponding to said given image data, said given image data including first and second views of a same structure;

calculating correlation values between the given image data and said first and second template image data; and identifying said given image data corresponding to one of said first and second views based on the correlation values calculated in the calculating step, wherein said identifying step comprises comparing said first and second correlation values with a first threshold and with each other, and determining, when one of the correlation values exceeds said first threshold and is greater than the other correlation value by a first predetermined amount, that the given image data corresponds to the view of whichever of said first and second template image data yielded said one of said correlation values.

2. The method of claim 1, wherein said obtaining step comprises:

obtaining temporal image data purported to be derived from the same patient as the given image data but at an earlier time.

3. The method of claim 2, wherein said obtaining step comprises:

reducing a matrix size of the obtained temporal image data to produce a reduced size matrix image and using the reduced size matrix image as said template image data.

4. The method of claim 1, wherein:

said calculating step comprises, a) calculating a correlation value based on said given image data and said template image data;

b) shifting one of the given image data and the template image data horizontally and vertically incrementally and for each incremental shift calculating a correlation value therebetween, c) determining a first best match between the given image data and the template image data based on the correlation values calculated in steps a) and b), d) rotating incrementally one of the given image data and the template image data yielding the first best match and calculating a correlation value therebetween at each rotational increment, and e) determining a second best match between the given image data and the template image data based on the correlation values calculated in step d); and said identifying step comprises identifying said image data based on the correlation value corresponding to said second best match.

5. The method of claim 2, wherein:

said calculating step comprises, a) calculating a correlation value based on said given image data and said template image data;

b) shifting one of the given image data and the template image data horizontally and vertically incrementally and for each incremental shift calculating a correlation value therebetween, c) determining a first best match between the given image data and the template image data based on the correlation values calculated in steps a) and b), d) rotating incrementally one of the given image data and the template image data yielding the first best match and calculating a correlation value therebetween at each rotational increment, and e) determining a second best match between the given image data and the template image data based on the correlation values calculated in step d); and said identifying step comprises identifying said image data based on the correlation value based on the correlation value corresponding to said second best match.

6. The method of claim 3, wherein:

said calculating step comprises, a) calculating a correlation value based on said given image data and said template image data;

b) shifting one of the given image data and the template image data horizontally and vertically incrementally and for each incremental shift calculating a correlation value therebetween, c) determining a first best match between the given image data and the template image data based on the correlation values calculated in steps a) and b), d) rotating incrementally one of the given image data and the template image data yielding the first best match and calculating a correlation value therebetween at each rotational increment, and e) determining a second best match between the given image data and the template image data based on the correlation values calculated in step d); and said identifying step comprises identifying said image data based on the correlation value based on the correlation value corresponding to said second best match.

7. The method of claims 1, 2, 3, 4, 5 or 6, wherein said identifying step comprises:

identifying whether the given image data was derived from the same patient from which the template image data was derived.

8. The method of claims 1, 2, 3, 4, 5 or 6, wherein said identifying step comprises:

identifying whether the given image data was derived from the same anatomical structure as that from which the template image data was derived.

9. The method of claim 1, comprising:

obtaining original image data of a patient; and reducing a matrix size of the original image data to produce said given image data.

10. The method of claim 1, wherein said step of obtaining comprises:

obtaining template image data corresponding to averaged image data derived from plural images.

11. The method of claim 1, wherein said step of obtaining comprises:

obtaining first and second template image data each corresponding to averaged image data derived from plural images.

12. The method of claim 1, wherein:

said step of obtaining template image data comprises obtaining first and second template image data corresponding to PA and lateral views, respectively; and said identifying step comprises identifying whether said given image data corresponds to a PA view or a lateral view in consideration of the correlation values calculated in said calculating step.

13. The method of claim 1, wherein:

said step of obtaining plural template image data comprises obtaining first and second template image data corresponding to PA views and lateral views, respectively, of average sized patients, small-size patients and large-size patients; and said identifying step comprises identifying whether said given image data corresponds to a PA view or a lateral view in consideration of the first and second correlation values.

14. The method of claim 1, wherein when one of said first and second correlation values exceeds the first threshold but does not have a value greater than the other correlation value by said first predetermined amount, the method further comprises:

obtaining third and fourth template image data corresponding to corresponding to PA and lateral views of small sized patients, respectively, and fifth and sixth template image data corresponding to PA and lateral views of large sized patients, respectively;

calculating third, fourth, fifth and sixth correlation values between said given image data and said third, fourth, fifth and sixth template image data, respectively; and determining which of the third through sixth correlation values is the greatest, and identifying the given image data as corresponding to the view of the template image data yielding the correlation value.

15. The method of claim 1, wherein when neither of said first and second correlation values exceeds the first threshold, the method further comprises:

eliminating edge pixels from said given image data and said first and second template image data to produce reduced given image data and reduced first and second template image data;

calculating third and fourth correlation values between said reduced given image data and said reduced first and second template image data; and said identifying step comprises, comparing said third and fourth correlation values with a second threshold and with each other, and determining, when one of the third and fourth correlation values exceeds said second threshold and is greater than the other of said third and fourth correlation values by a second predetermined amount, that the given image data corresponds to the view of whichever of said reduced first and second template image data yielded said one of said third and fourth correlation values.

16. The method of claim 15, wherein when one of said third and fourth correlation values exceeds the second threshold but does not have a value greater than the other of said third and fourth correlation values by the second predetermined amount, the method further comprises:

obtaining third and fourth template image data corresponding to corresponding to PA and lateral views of small sized patients, respectively, and fifth and sixth template image data corresponding to PA and lateral views of large sized patients, respectively;

eliminating edge pixels from said third through sixth template image data to obtain reduced third through sixth template image data;

calculating fifth, sixth, seventh and eighth correlation values between said reduced given image data and said reduced third, fourth, fifth and sixth template image data, respectively; and determining which of the fifth through eighth correlation values is the greatest, and identifying the given image data as corresponding to the view of the reduced third through fourth template image data yielding the greatest of said fifth through eighth correlation values.

17. The method of claim 13, comprising:

obtaining original image data of a patient; and reducing a matrix size of the original image data to produce said given image data.

18. The method of claim 13, wherein said step of obtaining comprises:

obtaining first and second template image data each corresponding to averaged image data derived from plural images.

19. The method of claim 1, wherein said step of obtaining comprises:

obtaining first and second template image data each corresponding to averaged image data derived from plural images.

20. The method of claim 1, wherein:

said step of obtaining first and second template image data comprises obtaining first template image data corresponding to first and second views of a skull.

21. The method of claim 1, wherein:

said step of obtaining first and second template image data comprises obtaining first template image data corresponding to first and second views of a hand.

22. The method of claim 1, wherein:

said step of obtaining first and second template image data comprises obtaining first template image data corresponding to first and second views of a foot.

23. The method of claim 1, wherein:

said step of obtaining first and second template image data comprises obtaining first template image data corresponding to first and second views of an abdomen.

24. The method of claim 1, wherein:

said step of obtaining first and second template image data comprises obtaining first template image data corresponding to first and second ultrasound data.

25. The method of claim 1, wherein:

said step of obtaining first and second template image data comprises obtaining first template image data corresponding to first and second computed topography (CT) data.

26. The method of claim 1, wherein:

said step of obtaining first and second template image data comprises obtaining first template image data corresponding to first and second magnetic resonance imaging (MRI) data.

27. An image processing system configured to perform the steps recited in any one of claims 1–6 and 10–14, 16–26.

28. An image processing system configured to perform the steps recited in claim 7.

29. An image processing system configured to perform the steps recited in claim 8.

30. A storage medium storing a program for performing the steps recited in any one of claims 1–6 and 10–14, 16–28.

31. A storage medium storing a program for performing the steps recited in claim 7.

32. A storage medium storing a program for performing the steps recited in claim 8.

* * * * *